US008075746B2

(12) United States Patent
Hartvigsen et al.

(10) Patent No.: US 8,075,746 B2
(45) Date of Patent: Dec. 13, 2011

(54) ELECTROCHEMICAL CELL FOR PRODUCTION OF SYNTHESIS GAS USING ATMOSPHERIC AIR AND WATER

(75) Inventors: Joseph J. Hartvigsen, Kaysville, UT (US); Ashok V. Joshi, Salt Lake City, UT (US); S. Elangovan, Draper, UT (US); Shekar Balagopal, Sandy, UT (US); John Howard Gordon, Salt Lake City, UT (US); Michele Hollist, South Jordan, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 1448 days.

(21) Appl. No.: 11/467,524

(22) Filed: Aug. 25, 2006

(65) Prior Publication Data

US 2007/0045125 A1 Mar. 1, 2007

Related U.S. Application Data

(60) Provisional application No. 60/711,252, filed on Aug. 25, 2005.

(51) Int. Cl.
*C25B 9/00* (2006.01)
*C25B 9/06* (2006.01)
*C25D 17/00* (2006.01)

(52) U.S. Cl. ........................................ 204/242; 204/194

(58) Field of Classification Search .................. 204/194, 204/242
See application file for complete search history.

(56) References Cited

U.S. PATENT DOCUMENTS

| | | | |
|---|---|---|---|
| 4,120,763 A | 10/1978 | Breda et al. | |
| 4,674,321 A | 6/1987 | Joshi | |
| 4,768,371 A | 9/1988 | Joshi | |
| 4,879,016 A | 11/1989 | Joshi | |
| 5,021,137 A | 6/1991 | Joshi et al. | |
| D333,005 S | 2/1993 | Taylor | |
| 5,273,628 A | 12/1993 | Liu et al. | |
| 5,290,405 A | 3/1994 | Joshi et al. | |
| 5,338,623 A | 8/1994 | Nachlas | |
| 5,346,679 A | 9/1994 | Osaki et al. | |
| 5,378,345 A | 1/1995 | Taylor et al. | |
| 5,399,246 A | 3/1995 | Joshi | |
| 5,401,372 A | 3/1995 | Liu et al. | |
| 5,454,923 A | 10/1995 | Nachlas et al. | |
| 5,478,444 A | 12/1995 | Liu et al. | |
| 5,479,700 A | 1/1996 | Nachlas et al. | |
| 5,578,189 A | 11/1996 | Joshi | |
| 5,580,430 A | 12/1996 | Balagopal et al. | |
| 5,593,552 A | 1/1997 | Joshi et al. | |

(Continued)

OTHER PUBLICATIONS

Young, Lee W., "PCT International Search Report for PCT/US06/33640", (Jul. 25, 2007),1-3.

(Continued)

*Primary Examiner* — Alexa Neckel
*Assistant Examiner* — Zulmariam Mendez
(74) *Attorney, Agent, or Firm* — David Fonda

(57) ABSTRACT

A method is provided for synthesizing synthesis gas from carbon dioxide obtained from atmospheric air or other available carbon dioxide source and water using a sodium-conducting electrochemical cell. Synthesis gas is also produced by the coelectrolysis of carbon dioxide and steam in a solid oxide fuel cell or solid oxide electrolytic cell. The synthesis gas produced may then be further processed and eventually converted into a liquid fuel suitable for transportation or other applications.

13 Claims, 6 Drawing Sheets

U.S. PATENT DOCUMENTS

| | | | |
|---|---|---|---|
| 5,607,572 A | | 3/1997 | Joshi |
| 5,616,223 A | | 4/1997 | Shen et al. |
| 5,624,542 A | | 4/1997 | Shen et al. |
| 5,681,373 A | | 10/1997 | Taylor et al. |
| 5,750,279 A | | 5/1998 | Carolan et al. |
| 5,804,045 A | | 9/1998 | Orillon et al. |
| 5,868,918 A | | 2/1999 | Adler et al. |
| 5,888,368 A | | 3/1999 | Posar |
| 5,985,110 A | * | 11/1999 | Bakhir et al. .................. 204/257 |
| 6,042,703 A | | 3/2000 | Adler et al. |
| 6,060,196 A | | 5/2000 | Gordon et al. |
| 6,060,197 A | | 5/2000 | McEvoy et al. |
| 6,117,288 A | | 9/2000 | Adler et al. |
| 6,428,678 B1 | | 8/2002 | Rennebeck |
| 6,464,845 B2 | * | 10/2002 | Shirota et al. .................. 204/263 |
| 6,887,361 B1 | * | 5/2005 | Visco et al. .................... 204/491 |
| 2005/0115841 A1 | | 6/2005 | Ozawa et al. |
| 2005/0177008 A1 | | 8/2005 | Balagopal et al. |

OTHER PUBLICATIONS

Young, Lee W., "PCT Written Opinion of the International Searching Authority for PCT/US06/33640", (Jul. 25, 2007),1-7.

* cited by examiner

ELECTROCHEMICAL CELL FOR PRODUCTION OF SYNTHESIS GAS USING ATMOSPHERIC AIR AND WATER

CROSS-REFERENCE TO RELATED APPLICATIONS

This application claims the benefit of U.S. Provisional Application No. 60/711,252 filed Aug. 25, 2005, incorporated herein by reference.

FIELD OF THE INVENTION

The present invention relates in general to methods for producing synthesis gas from easily obtainable precursors, and more particularly, to the generation of such synthesis gas from atmospheric air and water.

BACKGROUND OF THE INVENTION

Users of fuels such as gasoline and diesel (in commercial applications) and JP-8, F-76 and other similar fuels (in military applications) have benefited from the existence of an extensive and well-established infrastructure for their shipping, delivery to end users, and use. The presence of this infrastructure has also enabled technology development of liquid fuel-based systems for uses ranging from automobiles to military aircraft. Within areas well-served by this infrastructure, dependence upon such liquid fuel-based systems is largely unquestioned.

In some applications, however, continued dependence on the availability of such liquid fuel products is unwise. Such applications include industrial or commercial applications in primitive regions and military operations in remote locations away from standard supply systems and sources. In applications such as military logistics supporting extended naval missions, assuring the availability of a steady and sufficient supply of liquid fuel products may become critically important and very difficult. While all-electric-powered ships and aircraft are planned, moves toward these platforms are slow and their completion is still only foreseen in the somewhat distant future. It is anticipated that a transition away from liquid fuels will be simpler and more rapidly adopted in larger apparatus such as aircraft carriers via the use of on-board nuclear power plants than in smaller equipment such as aircraft.

As a result, it is anticipated that reliance upon liquid fuel-based systems will continue well into the foreseeable future. It would thus be beneficial to provide new methods and systems for generating liquid fuels using electricity and commonly-available resources that could be employed on-location to reduce the criticality of long supply chains. The availability of such a process based on plentiful electricity and common resources could speed conversion to all-electric power sources in some simpler applications while retaining support for others in which electric power-based systems are either difficult or impractical.

Such methods and systems are provided herein.

BRIEF SUMMARY OF THE INVENTION

The present invention is directed to processes, methods, and systems for the production of synthesis gas for fuel production or other applications. The processes, methods, and systems of the present invention utilize commonly-available resources as inputs and rely upon electricity to provide synthesis gas as and output.

The present invention includes an electrochemical cell for producing synthesis gas. In one embodiment within the scope of the invention, the electrochemical cell includes an anode chamber containing an electrochemically active anode. Water is decomposed at the anode to produce oxygen and hydrogen ions. The oxygen is preferably collected and removed from the anode chamber. A source of sodium carbonate is provided which reacts with the hydrogen ions and decomposes to form carbon dioxide, water, and sodium ions. The carbon dioxide is preferably collected and removed.

In one embodiment, the anode chamber is divided by a separator, permeable to hydrogen ions, to form an intermediate chamber. The separator which permits transport of hydrogen ions may be a microporous separator, a cation exchange membrane, a mesh or a screen. In this embodiment, the sodium carbonate is added to the intermediate chamber. The anode chamber need not be divided by a separator, but a separator may facilitate collection and removal of the oxygen and carbon dioxide gases. It may also eliminate the need for later separation of carbon dioxide from oxygen.

The electrochemical cell includes a cathode chamber containing an electrochemically active cathode separated from the anode chamber, or intermediate chamber, by a membrane which permits transport of $Na^+$ ions. The membrane which permits transport of $Na^+$ ions is preferably a sodium super ionic conductor ceramic material, a cation exchange membrane, or other similar membrane.

Water is reduced in the cathode chamber to produce hydrogen gas and hydroxyl ions. The hydroxyl ions combine with sodium ions to form sodium hydroxide. The hydrogen gas is collected and removed from the cathode chamber.

The system or process includes means for facilitating the reaction of $CO_2$ and $H_2$ to form synthesis gas comprising CO and additional $H_2$. Such means may include a catalyst exposed to the mixture of $CO_2$ and $H_2$. The catalyst may be a watergas shift catalyst or a Fischer-Tropsch catalyst. The mixture of $CO_2$ and $H_2$ may alternatively be heated to enable a homogenous gas phase equilibrium reaction with CO and $H_2O$. The means for facilitating the reaction of $CO_2$ and $H_2$ to form synthesis gas may include an oxygen ion conducting electrolysis cell to cause electrolysis of $CO_2$ to CO, which with the $H_2$ comprises synthesis gas.

In the foregoing embodiment, sodium hydroxide is preferably removed from the cathode and reacted with a source of carbon dioxide to form sodium carbonate which may replenish the sodium carbonate decomposed in the anode chamber. The source of carbon dioxide includes, but is not limited to atmospheric air, combustion gases, and aerobic decomposition gases.

The electrochemical cell may be embodied within a plurality of stacked electrochemical cells separated by bipolar plates. The use of stacked electrochemical cells may enable the efficient production of large quantities of synthesis gas.

The electrochemical cell may perform a process for producing synthesis gas by decomposing water within an anode chamber according to the following reaction: $½H_2O \rightarrow ¼O_2 + H^+ + e^-$ and removing oxygen from the anode chamber. $Na_2CO_3$ and $H^+$ ions may react within anode chamber according to the following reaction: $H^+ + ½Na_2CO_3 \rightarrow ½CO_2 + ½H_2O + Na^+$. This reaction preferably occurs at a location a distance away from the anode but within the anode chamber. The process includes the steps of removing $CO_2$ from the anode chamber at a location near where it is produced and transporting $Na^+$ ions from the anode chamber to a cathode chamber. Water decomposes within the cathode chamber according to the following reaction: $Na^+ + H_2O + e^- \rightarrow NaOH + ½H_2$. $H_2$ is collected and removed from the cathode chamber.

The collected $CO_2$ and $H_2$ react to form synthesis gas comprising CO and $H_2$. NaOH may be removed from the cathode chamber, reacted with carbon dioxide to form $Na_2CO_3$, and transported to the anode to replenish the $Na_2CO_3$ consumed in the reaction with hydrogen ions.

Another embodiment within the scope of the invention includes an electrochemical device for the coelectrolysis of carbon dioxide and steam to produce synthesis gas. This electrochemical device includes an oxygen ion conducting membrane, a cathode attached to one surface of the oxygen ion conducting membrane and an anode attached to an opposite surface of the oxygen ion conducting membrane. The cathode is electrochemically active for reduction of steam to form hydrogen and oxygen ions. The anode is electrochemically active for recombination of oxygen ions into oxygen molecules.

A source of steam and carbon dioxide may contact the cathode under conditions which cause the following reactions to occur: $H_2O+2e^- \rightarrow H_2+O^{-2}$, $CO_2+2e^- \rightarrow CO+O^{-2}$ and $CO_2+H_2 \leftrightarrow CO+H_2O$. Synthesis gas comprising CO and $H_2$ is collected and recovered at the cathode, and oxygen ions are conducted through the oxygen ion conducting membrane to the anode where they are recombined to form $O_2$, which is collected and recovered.

The cathode preferably comprises a mixture of nickel oxide and another oxide. In one embodiment, the cathode comprises a first metal oxide and a solid solution of nickel oxide and a second metal oxide selected from the group consisting of magnesium oxide, cobalt oxide, copper oxide, and mixtures thereof. The second metal oxide is preferably present in an amount from 1 to 50 mole % relative to the nickel oxide. In one embodiment, the first metal oxide is zirconia doped with one or more oxides selected from the group consisting of yttrium oxide, ytterbium oxide, calcium oxide, magnesium oxide, and scandium oxide. In another embodiment, the first metal oxide is ceria doped with one or more oxides selected from samarium oxide, gadolinium oxide, yttrium oxide, ytterbium oxide, calcium oxide, magnesium oxide, and scandium oxide. In yet another embodiment, the first metal oxide is lanthanum gallium oxide doped with one or more elements selected from strontium, magnesium, iron, and cobalt. The cathode preferably comprises a surface dispersed catalyst selected from the group consisting of Pr, Co, Ce, Eu, other rare earth elements and mixtures thereof.

The anode preferably comprises a mixture of perovskite and an oxide. In one embodiment, the anode comprises a mixture of perovskite and an anode oxide, wherein the perovskite is $(Pr_{1-x}La_x)_{x-y}A_yBO_{3-\delta}$, where A is an alkaline earth metal selected from Sr and Ca and mixtures thereof, B is a transition metal selected from Mn, Co, Fe, and mixtures thereof, with $0 \leq x \leq 1$, $0 \leq y \leq 0.5$, $0.8 \leq z \leq 1.1$, $\delta$ is an oxygen non-stoichiometry value, wherein the anode oxide is selected from zirconia doped with one or more of yttrium oxide, ytterbium oxide, calcium oxide, magnesium oxide, scandium oxide, and cerium oxide and ceria doped with one or more of yttrium oxide, ytterbium oxide, calcium oxide, magnesium oxide, scandium oxide, and zirconium oxide. One presently preferred perovskite material is $Pr_{0-x}Sr_{0.2}MnO_{3-\delta}$. The anode preferably comprises a surface dispersed catalyst selected from the group consisting of Pr, Co, Ce, Eu, other rare earth elements, Sr, Ca, and mixtures thereof.

The source of carbon dioxide is preferably selected from atmospheric air, combustion gases, or aerobic decomposition gases.

Other advantages and aspects of the present invention will become apparent upon reading the following description of the drawings and detailed description of the invention. These and other features and advantages of the present invention will become more fully apparent from the following figures, description, and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
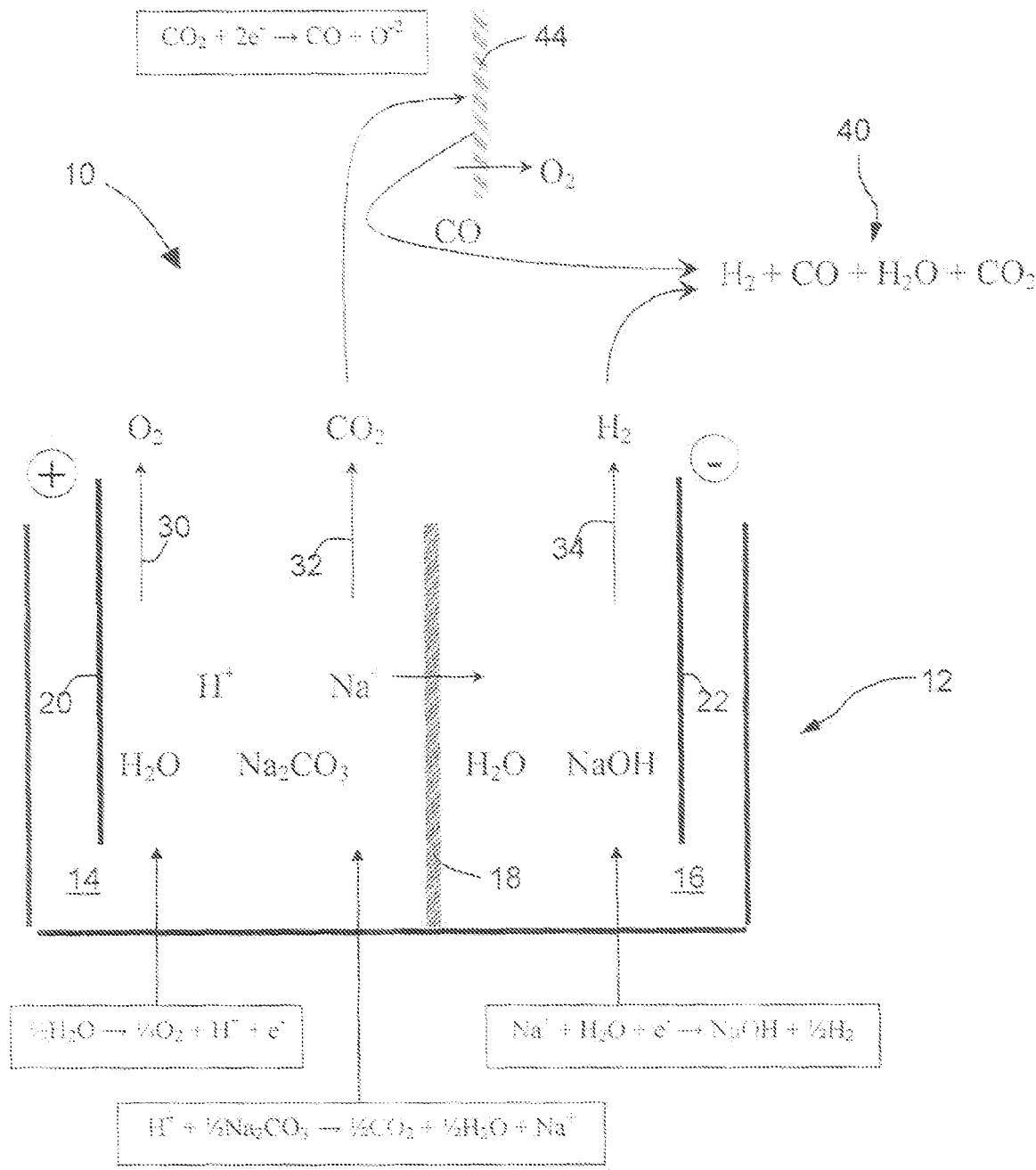
FIG. 1 is a schematic view of a two-compartment electrochemical cell for generating synthesis gas within the scope of the present invention.

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the processes, methods, and systems for the production of synthesis gas for fuel or other applications of the present invention, as represented in FIGS. 1 through 6, is not intended to limit the scope of the invention, as claimed, but is merely representative of presently preferred embodiments of the invention.

In a first embodiment of the processes of the present invention, a process is disclosed for producing synthesis gas, also known as "syngas," comprising a mixture of CO and $H_2$. This process 10 is illustrated schematically in FIG. 1. The process 10 utilizes a two-compartment electrochemical cell 12. The electrochemical cell includes an anode compartment or chamber 14 and a cathode compartment or chamber 16. A sodium-conducting membrane 18 separates the anode chamber 14 from the cathode chamber 16. Suitable sodium-conducting membranes 18 include NaSICION (sodium (Na) Super Ionic CONductor) ceramic materials, as well as other ceramic and polymer cation exchange membranes known to persons skilled in the art.

The anode chamber 14 includes an electrochemically active anode 20 and a source of water which the water ($H_2O$) is decomposed according to the following reaction:

$$\tfrac{1}{2}H_2O \rightarrow \tfrac{1}{4}O_2 + H^+ + e^- \quad (1)$$

The $O_2$ is collected and removed from the anode chamber 14.

In this process 10, sodium carbonate ($Na_2CO_3$) is decomposed in the anode chamber 20 of the electrochemical cell 12 to produce carbon dioxide ($CO_2$) according to the following reaction:

$$H^+ + \tfrac{1}{2}Na_2CO_3 \rightarrow \tfrac{1}{2}CO_2 + \tfrac{1}{2}H_2O + Na^+ \quad (2)$$

The $CO_2$ is collected and removed from the anode chamber 14. Sodium ions are transferred across the sodium-conducting membrane 18. A source of sodium carbonate is provided sufficiently close to the anode 14 so that the sodium carbonate reacts with $H^+$ ions in solution. It may be preferred to space the sodium carbonate a sufficient distance away from the anode to facilitate separate removal of the $O_2$ produced at the anode 14 and the $CO_2$ produced by the decomposition of sodium carbonate. Sodium carbonate may be directly provided for use in the cell 12, or may alternatively be readily obtained by the reaction of sodium hydroxide with a carbon dioxide source according to the following reaction:

$$NaOH + \tfrac{1}{2}CO_2 \rightarrow \tfrac{1}{2}Na_2CO_3 + \tfrac{1}{2}H_2O \quad (3)$$

Examples of typical carbon dioxide sources include, but are not limited to, atmospheric air, combustion gases, or aerobic decomposition gases. Aerobic decomposition gases include gases naturally produced upon decomposition of various organic materials, including waste materials.

The cathode chamber 16 includes an electrochemically active cathode 22 and a source of water in which the water is reduced according to the following reaction:

$$Na^+ + H_2O + e^- \rightarrow NaOH + \tfrac{1}{2}H_2 \quad (4)$$

The $H_2$ is collected and removed from the cathode chamber. The NaOH may optionally be collected and removed from the cathode chamber, as shown by NaOH stream 24 in FIG. 2. As mentioned above, sodium hydroxide may be reacted with a source of carbon dioxide 26 to form sodium carbonate which may be recycled to the anode chamber as a sodium carbonate source 28, shown in FIG. 2.

By applying an electrical potential across the two-compartment cell 12, water and sodium carbonate are decomposed and produce a flow 30 of oxygen and a flow 32 of carbon dioxide. The reduction of water at the cathode 22 generates hydroxyl ions and a flow 34 of hydrogen gas. As the sodium ions migrate through the membrane 18 from the anolyte side (anode chamber 14) of the cell 12 to the catholyte side (cathode chamber 16), they will combine with the hydroxyl ions produced by the reduction of water to form sodium hydroxide solution as shown in reaction (4).

Figure 2:
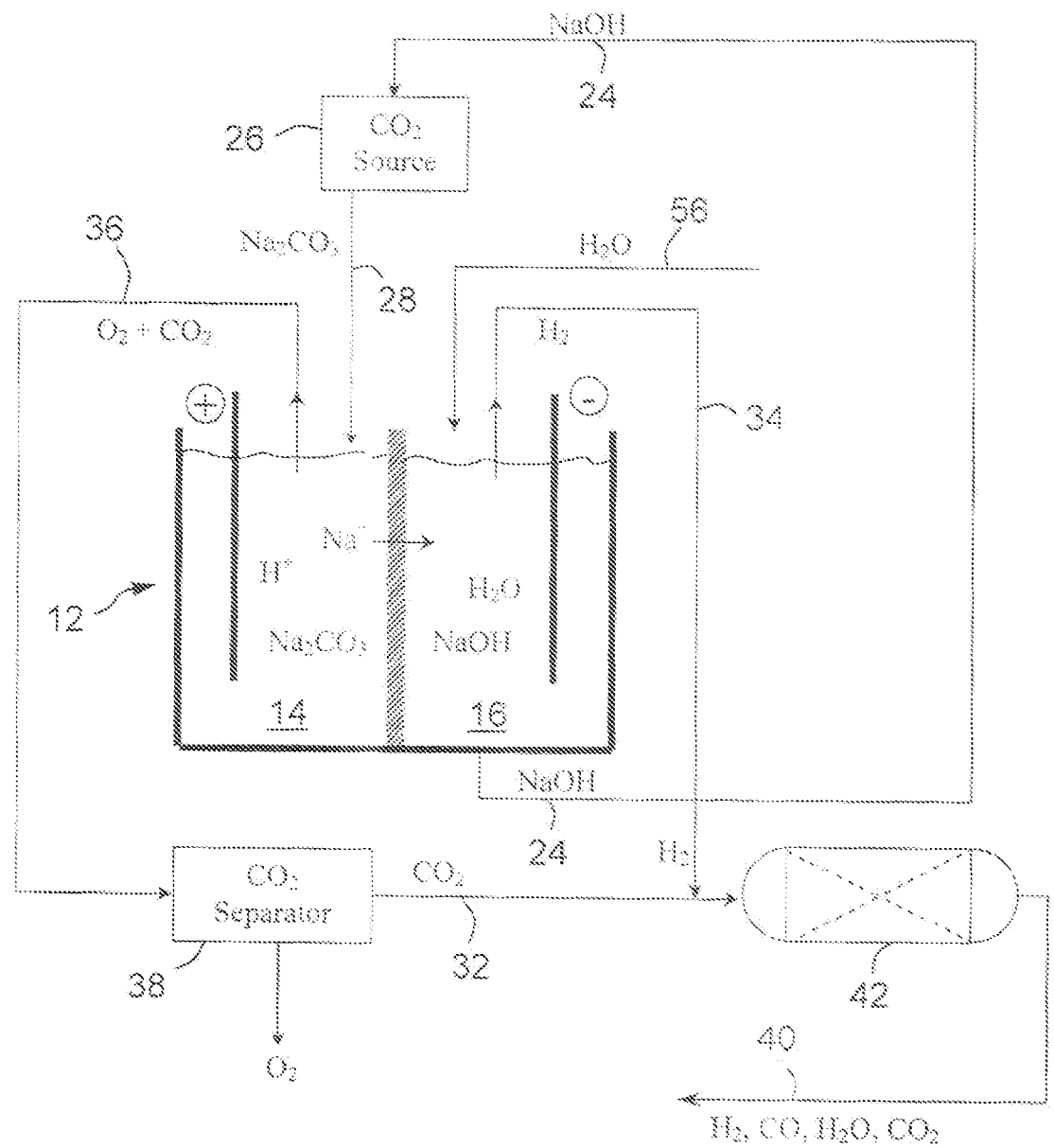
FIG. 2 is a schematic view of an electrochemical cell for generating synthesis gas showing recycle of NaOH and regeneration of $NaCO_3$ and capture and separation of $CO_2$.

During operation of the electrochemical cell 12, oxygen and carbon dioxide may be collected as separate gas flows 30, 32 or they may be mixed gases 36, shown in FIG. 2. If mixed, the oxygen is preferably separated from the carbon dioxide in a carbon dioxide separator 38 so that the carbon dioxide may be used in subsequent process steps. Carbon dioxide separation in carbon dioxide separator 38 may be conducted using various processes known to those of ordinary skill in the art. Such processes include, but are not limited to, use of activated carbon or molecular sieves to absorb $CO_2$ from the gases removed from the cathode 14. Such techniques often utilize multiple absorption beds which are rotated such that those which are full are rotated out of the gas stream and stripped prior to continued use. Other methods include filtration of the gas stream 36 using a polymeric membrane selectively permeable by either $O_2$ or $CO_2$, or using $CO_2$-absorbent fluids such as amine solutions presented to the gas stream 36 as in a scrubber unit. Oxygen may be separated from carbon dioxide by exposing the mixed $CO_2$ and $O_2$ gas stream to an oxygen-conducting membrane such as yttria-stabilized zirconia (or "YSZ") to extract the oxygen. Other methods of separating $CO_2$ and $O_2$ are well known to those of ordinary skill in the art and may be implemented within the scope of the invention.

The cathode chamber 16 of this embodiment of the electrochemical cell 12 contains water and sodium hydroxide as the catholyte. In the cathode chamber 16, water is reduced in the presence of sodium ions to release a flow of hydrogen gas 34 and form sodium hydroxyide. Thus, the reactions conducted in the electrochemical cell 12 may be represented as follows:

Anode $H_2O \rightarrow \tfrac{1}{2}O_2 + 2H^+ + 2e^-$ $2H^+ + Na_2CO_3 \rightarrow CO_2 + H_2O + 2Na^+$ $Na_2CO_3(aq) \rightarrow CO_2 + \tfrac{1}{2}O_2 2Na^+ + 2e^-$ (overall)

Cathode $2Na^+ + 2H_2O + 2e^- \rightarrow 2NaOH + H_2$

Overall $Na_2CO_3 + 2H_2O \rightarrow 2NaOH + CO_2 + H_2 + \tfrac{1}{2}O_2$

The $CO_2$ flow 32 from the anode chamber 14 and the $H_2$ flow 34 from the cathode chamber 16 may be combined and further processed to convert the $CO_2$ into CO to form syngas 40. $CO_2$ and $H_2$ may react to form the components of the syngas mixture 40 ($CO + H_2$). Syngas may be obtained from $CO_2$ and $H_2$ according to one or more of the following reactions:

$$CO_2 + 2e^- \rightarrow CO + O^{-2} \quad (5)$$

$$CO_2 + H_2 \rightarrow CO + H_2O \quad (6)$$

It should be noted that such syngas mixtures 40 may also include amounts of $CO_2$ and $H_2O$. Means may be provided to facilitate the reaction of $CO_2$ and $H_2$ to form synthesis gas. Such means may include a catalytic reactor 42 in which a suitable catalyst is exposed to the mixture of $CO_2$ and $H_2$, as shown in FIG. 2. For example, the catalyst may be a watergas shift catalyst, also known as a shift catalyst or reverse shift catalyst. The catalyst may comprise a Fisher-Tropsch catalyst. The $CO_2$ and $H_2$ gases may be heated to facilitate a homogenous gas phase equilibrium reaction. Other means to facilitate the reaction of $CO_2$ and $H_2$ to form synthesis gas may comprise an oxygen ion conducting electrolysis cell 44 to cause electrolysis of $CO_2$ and from CO and $O_2$. The CO is collected, and with $H_2$, forms synthesis gas.

Figure 3:
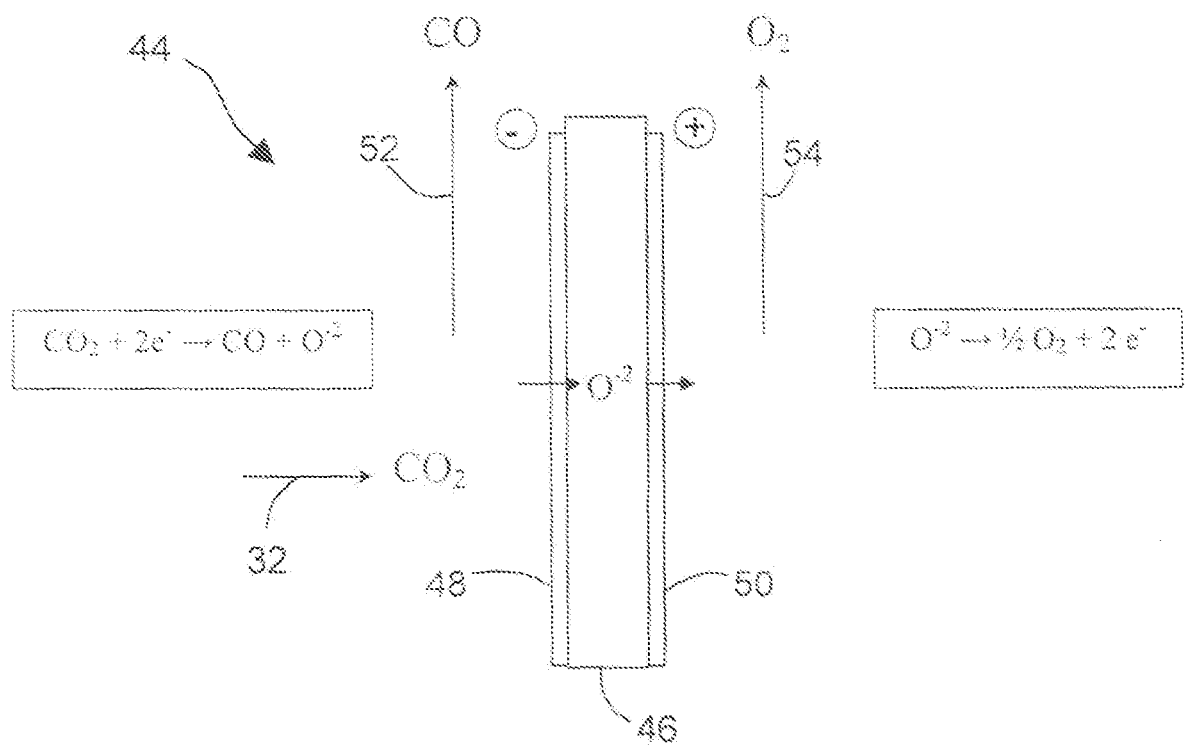
FIG. 3 is a schematic view of an oxygen ion conducting electrolysis cell useful in generating synthesis gas.

A schematic representation of an oxygen ion conducting electrolysis cell 44 is shown in FIG. 3. Cell 44 includes an oxygen ion conducting membrane 46. A variety of materials may be used to fabricate the oxygen ion conducting, including but not limited to, yttria-stabilized zirconia ("YSZ"). The electrochemical device for the electrolysis of carbon dioxide to product carbon monoxide may also include a source of carbon dioxide in contact with a cathode 48. The cathode 48 is attached to a surface of the oxygen ion conducting membrane 46 which is electrochemically active to reduce carbon dioxide to form carbon monoxide and oxygen ions according to reaction (5), above. CO is collected and recovered at the cathode the oxygen ions are conducted through the oxygen ion conducting membrane to the and anode 50. The anode 50 is attached to an opposite surface of the oxygen ion conducting membrane 42 which is electrochemically active for recombination of oxygen ions into oxygen molecules, according to the following reaction:

$$O^{-2} \rightarrow \tfrac{1}{2}O_2 + 2e^- \tag{7}$$

The cathode 48 and anode 50 should be sufficiently permeable to allow diffusion of carbon dioxide, oxygen, or other gaseous species that may react or be produced at the interface of the oxygen ion conductor 46 and the cathode 48 and the interface of the oxygen ion conductor 46 and the anode 50. By applying an electrical potential across the oxygen ion conducting electrolysis cell 44, carbon dioxide is reduced to form carbon monoxide and oxygen. It produces a flow 52 of carbon monoxide and a flow 45 of oxygen. The reduction of carbon dioxide at the cathode 48 generates oxygen ions and the flow 52 of carbon monoxide. As the oxygen ions migrate through the membrane 46 from the cathode 48 to the anode 50 they will combine to form oxygen as shown in reaction (7), above.

Figure 6:
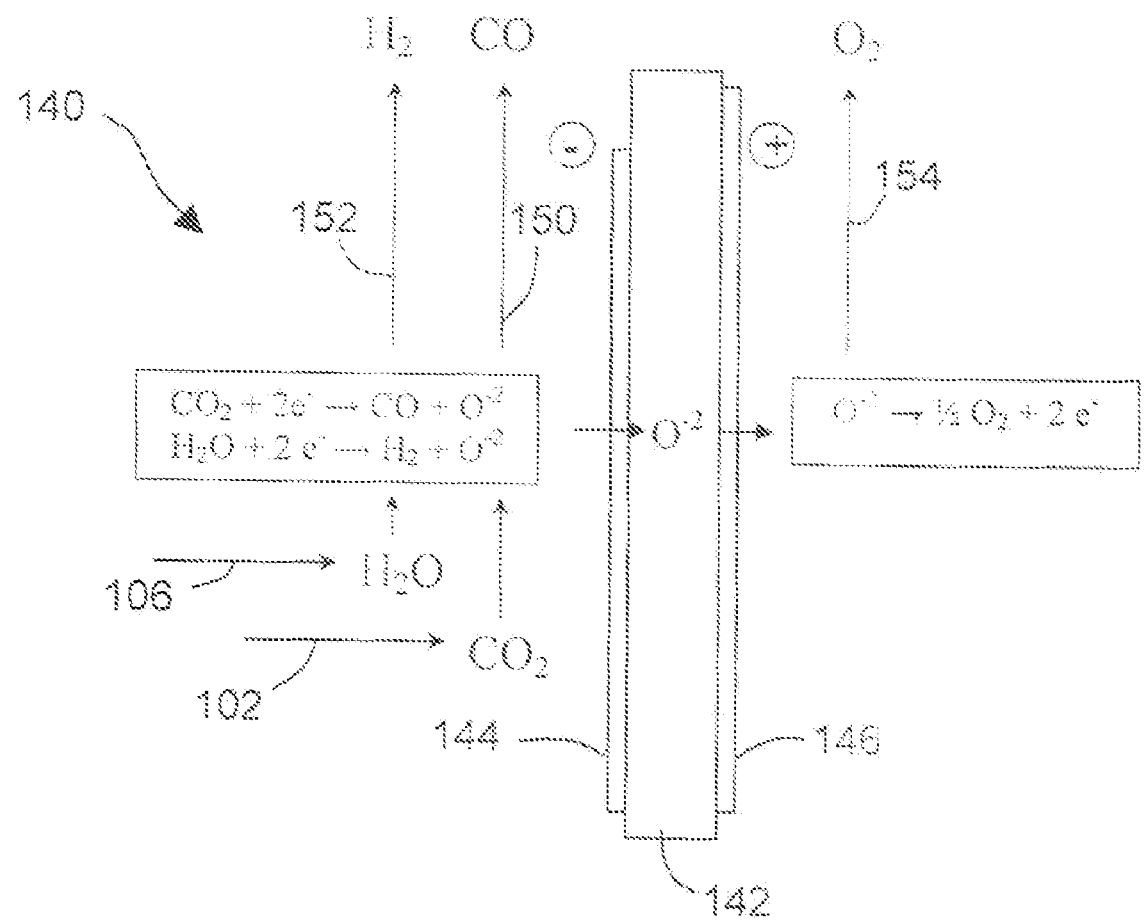
FIG. 6 is a schematic view of another oxygen ion conducting electrolysis cell useful in generating synthesis gas.

The materials and configurations used for the cathode 48 and anode 50 may be the same or similar to those used in connection with the cathode and anode described below in connection with FIG. 6.

This syngas mixture 40 can be further processed to produce liquid hydrocarbon fuel using any suitable process available in the art. One such process commonly used to convert syngas 40 to liquid fuel is the Fischer-Tropsch process, in which syngas 40 is reacted in the presence of a catalyst (such as an iron or cobalt catalyst) to produce liquid hydrocarbon fuels. Other suitable processes, including variations on the Fischer-Tropsch process, are known to those of ordinary skill in the art, and could be used with the processes of the present invention. Here the term liquid hydrocarbon fuel also includes lighter hydrocarbons such as methane, ethane, propane, butane, etc. which may be vapors at ambient conditions but which also may be liquefied under pressure or cryogenic conditions. A typical Fischer-Tropsch process produces a wide distribution of hydrocarbon chain length, all having fuel value.

The processes and systems of the present invention further allow for replenishment of the electrochemical cell 12 using generally-readily-available materials. As mentioned above in relation to FIG. 2, the NaOH generated in the cathode chamber 16 may be recycled in NaOH stream 24 and reacted with $CO_2$ source 26, such as $CO_2$ in atmospheric air, via a spontaneous reaction (encouraged by heat) to generate the sodium carbonate. The regenerated sodium carbonate or other sodium carbonate source 28 may replenish the sodium carbonate consumed in the anode chamber 14. Various systems for speeding this process are available and known to one of ordinary skill in the art. This allows the anode chamber 14 to be replenished. The cathode chamber 16, on the other hand, may be replenished by adding water 56. Alternatively, the sodium carbonate regeneration step may be skipped and the electrochemical cell may be replenished by direct supply of sodium carbonate. Thus, this embodiment of the processes of the present invention only requires electric power, $CO_2$ from a carbon source or from atmospheric air, and water as the only inputs needed to generate syngas.

Figure 4:
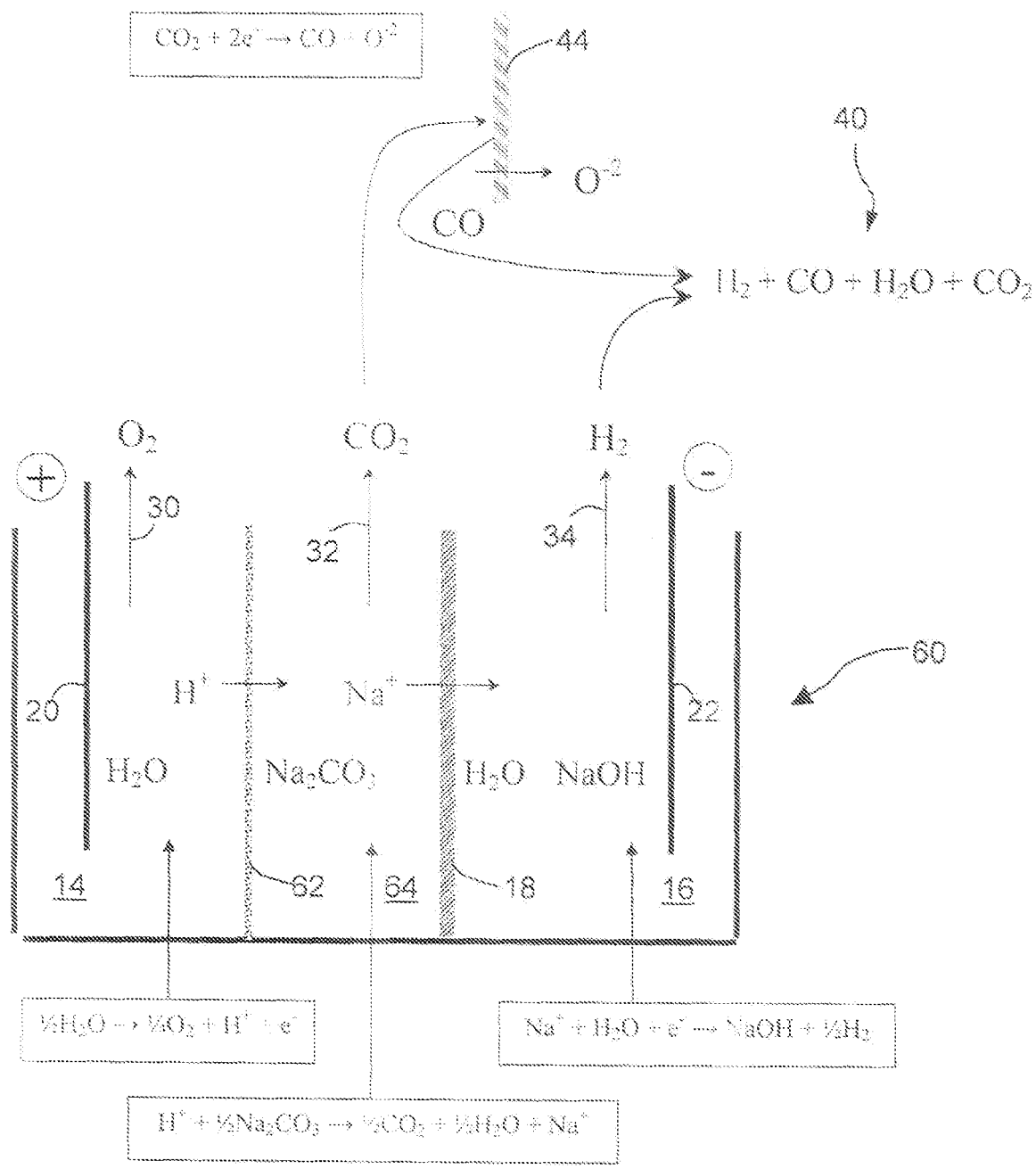
FIG. 4 is a schematic view of a three-compartment electrochemical cell for generating synthesis gas within the scope of the present invention.

In another embodiment within the scope of the present invention, a three-compartment electrochemical cell 60 is provided. Cell 60, shown in FIG. 4, is similar to cell 12, except that the anode chamber 14 includes a separator 62 which allows transport of $H^+$ ions. Suitable separators may include a microporous separator, cation exchange membrane, a mesh or a screen. In this embodiment, the separator 62 defines an intermediate chamber 64 disposed between the separator 62 and the sodium-conducting membrane 18. Water is decomposed at the anode 20 according to reaction (1), above.

Sodium carbonate is decomposed in the intermediate chamber according to reaction (2), above. The three-compartment electrochemical cell may facilitate collection, separation and removal of the product gases, oxygen, carbon dioxide, and hydrogen. A separate process for separating carbon dioxide from oxygen may not be required. In addition, a plurality of three-compartment electrochemical cells 60, separated by bipolar plates, may be stacked or connected in a way to efficiently generate large quantities of carbon dioxide and hydrogen for use in producing synthesis gas.

Figure 5:
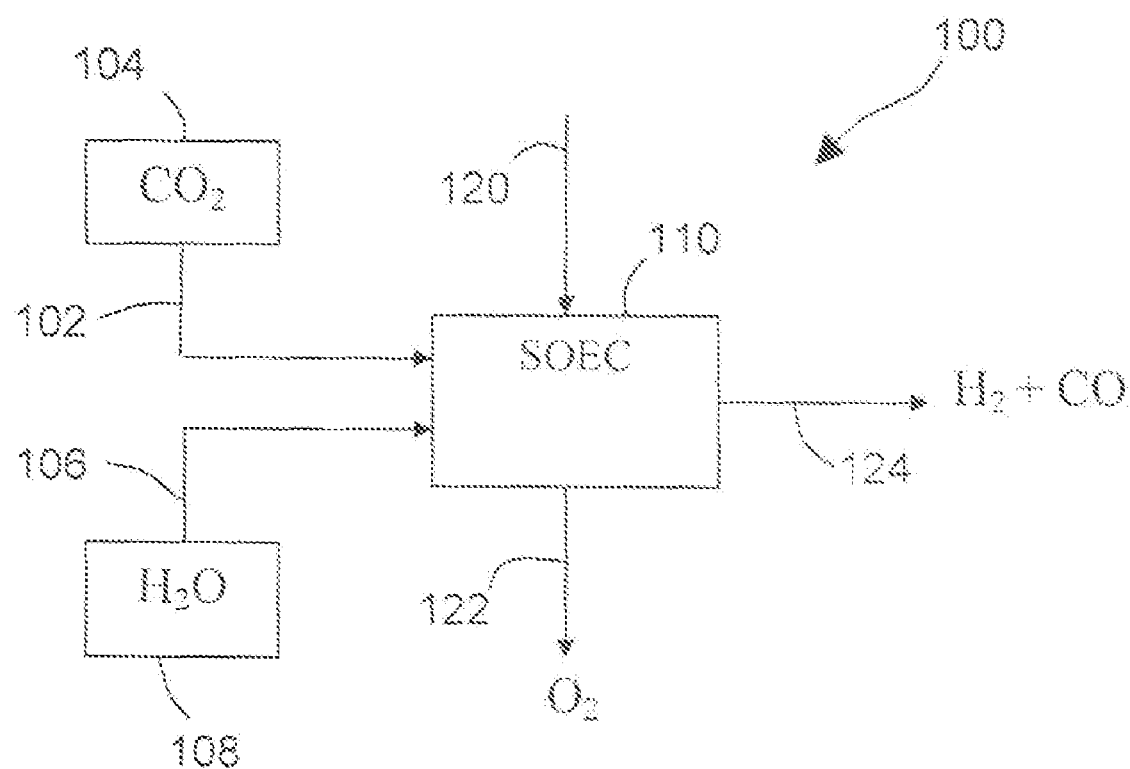
FIG. 5 is a schematic view of a synthesis gas generating system which produces synthesis gas from the coelectrolysis of steam and carbon dioxide.

In yet another embodiment of the methods of the present invention, syngas 40 may be produced by the coelectrolysis of carbon dioxide and steam. FIG. 5 includes a diagram of this process 100. In this process 100, a flow 102 of carbon dioxide is provided from a carbon dioxide source 104, such as discussed above. The carbon dioxide source may include a gas separator, discussed above, to separate carbon dioxide from atmospheric air. The process 100 also includes a flow of steam 106 provided from a source of steam 108. The carbon dioxide flow 102 and steam flow 106 are sent to a solid oxide electrolysis cell (SOEC) 110. Electricity 120 and any required heat are provided to the cell 110 to drive the following reactions:

$$CO_2 + 2e^- \rightarrow CO + O^{-2} \tag{5}$$

$$H_2O + 2e^- \rightarrow H_2 + O^{-2} \tag{8}$$

$$O^{-2} \rightarrow \tfrac{1}{2}O_2 + 2e^- \tag{7}$$

The following additional reaction may also occur in the SOEC 110:

$$CO_2 + H_2 \leftrightarrow CO + H_2O \tag{6}$$

The net equation of the SOEC is shown as follows:

$$H_2O + CO_2 \rightarrow H_2 + CO + O_2 \tag{9}$$

In the SOEC 110, oxygen is stripped from the incoming $CO_2$ 102 and $H_2O$ 106 (as steam) by an oxygen ion-conducting electrolysis cell 140, similar to the electrolysis cell 44, discussed above and illustrated in FIG. 3. FIG. 6 shows that electrolysis cell 140 includes an oxygen ion conducting membrane 142. A variety of materials may be used to fabricate the oxygen ion conducting, including but not limited to, yttria-stabilized zirconia ("YSZ"). A cathode 144 is attached to a surface of the oxygen ion conducting membrane 142 which is electrochemically active to reduce carbon dioxide to form carbon monoxide and oxygen ions according to reaction (5), above, and also electrochemically active to reduce steam (water) to form hydrogen gas and oxygen ions according to reaction (8), above. An anode 146 is attached to an opposite surface of the oxygen ion conducting membrane 142 which is electrochemically active for recombination of oxygen ions into oxygen molecules, according to reaction (7), above.

The cathode 144 and anode 146 should be sufficiently permeable to allow diffusion of carbon dioxide, steam, oxygen, or other gaseous species that may react or be produced at the interface of the oxygen ion conductor 142 and the cathode 144 and the interface of the oxygen ion conductor 142 and the anode 146.

By applying an electrical potential across the oxygen ion conducting electrolysis cell 140, carbon dioxide and water are reduced to form carbon monoxide, hydrogen, and oxygen. It produces a flow 150 of carbon monoxide, a flow 152 of hydrogen, and a flow 154 of oxygen. The reduction of carbon dioxide and steam at the cathode 144 generates oxygen ions and the flow 150 of carbon monoxide and flow 152 of hydrogen. As the oxygen ions migrate through the membrane 142 from the cathode 144 to the anode 146 they will combine to form oxygen as shown in reaction (7), above.

This syngas mixture 40 can be further processed to produce liquid hydrocarbon fuel using any suitable process available in the art.

The carbon dioxide and steam are reduced at the cathode side 144 of the oxygen-ion conducting membrane. Oxygen ions are transported through the oxygen ion conducting membrane 142 and evolved at the anode 146 as oxygen gas. The SOEC 110 provides an outflow 122 of $O_2$. As with the process 10 of the invention, this process 100 results in an outflow 122 of $O_2$ and a separate stream of syngas 124 comprising CO, and $H_2$. The oxygen may be produced at high purity without any subsequent separation required. As also discussed above, the syngas 124 may be further processed to produce a liquid hydrocarbon fuel suitable for use with current equipment using known methods.

The anode may be a mixture of perovskite and an oxide. In one embodiment, the anode consists of a perovskite and an oxide mixed in the volume ratio of oxide, $0 \leq V_{oxide} \leq 70\%$. The anode perovskite may be $(Pr_{1-x}La_x)_{z-y}A_yBO_{3-\delta}$ where A is an alkaline earth in particular Sr or Ca, and B is a transition metal in particular Mn, Co and Fe and mixtures thereof, with $0 \leq x \leq 1.0$, $0 \leq y \leq 0.5$, $0.8 \leq z \leq 1.1$, $\delta$ is the oxygen non-stoichiometry determined by the crystalline chemistry and electro-neutrality conditions. The anode oxide may be zirconia doped with one or more of yttrium oxide, ytterbium oxide, calcium oxide, magnesium oxide, scandium oxide, and cerium oxide. The anode oxide could also be ceria doped with one or more of yttrium oxide, ytterbium oxide, calcium oxide, and magnesium oxide, scandium oxide, and zirconium oxide. In one embodiment, the oxide doping in zirconia and ceria ranges from about 2 to about 15 mole %.

The cathode may be a mixture of nickel oxide and an oxide. In one embodiment, the nickel oxide is a solid solution with magnesium oxide. The cathode solid solution may contain between about 1 to about 25 mole % magnesium oxide relative to the nickel oxide. The nickel oxide in the solid solution is reduced to nickel during cell operation. The oxide in the cathode may include one of the group of zirconia, ceria, and mixtures thereof. The zirconia in the cathode may be doped with one or more of yttrium oxide, ytterbium oxide, calcium oxide, magnesium oxide, and scandium oxide. Ceria in the cathode may be doped with one or more of samarium oxide, gadolinium oxide, yttrium oxide, ytterbium oxide, calcium oxide, magnesium oxide, and scandium oxide.

The anode and cathode may be infiltrated with a catalyst material. The catalyst may be a surface dispersed catalyst selected from one of the group of Pr, Co, Ce, Eu, other rare earth elements, and combinations thereof. The catalyst in addition may contain one or more of Sr and Ca. The catalyst may be infiltrated as a salt soluble in water or an organic solvent. The catalyst may also be infiltrated as oxide particles.

A source of steam and carbon dioxide in contact with the cathode 144 under conditions which cause the following reactions to occur: $H_2O + 2e^- \rightarrow H_2 + O^{-2}$, $CO_2 + 2e^- \rightarrow CO + O^{-2}$ and $CO_2 + H_2 \rightarrow CO + H_2O$, wherein synthesis gas comprising CO and $H_2$ is collected and recovered at the cathode and wherein oxygen ions are conducted through the oxygen ion conducting membrane to the anode where they are recombined to form $O_2$, which is collected and recovered.

While specific embodiments of the present invention have been illustrated and described, numerous modifications come to mind without significantly departing from the spirit of the invention, and are included within its scope.

The invention claimed is:

1. An electrochemical cell for producing synthesis gas comprising:
    an anode chamber comprising an electrochemically active anode having a source of water in which the water is decomposed according to the following reaction: $\frac{1}{2}H_2O \rightarrow \frac{1}{4}O_2 + H^+ + e^-$, wherein $O_2$ is collected and removed from the anode chamber;
    an intermediate chamber separated from the anode chamber by a separator which permits transport of $H^+$ ions, wherein the intermediate chamber has a source of $Na_2CO_3$ and $H^+$ ions, in which the $Na_2CO_3$ is decomposed according to the following reaction: $H^+ + \frac{1}{2}Na_2CO_3 \rightarrow \frac{1}{2}CO_2 + \frac{1}{2}H_2O + Na^+$, wherein $CO_2$ is collected and removed from the intermediate chamber;
    a cathode chamber comprising an electrochemically active cathode separated from the intermediate chamber by a membrane which permits transport of $Na^+$ ions, wherein the cathode chamber has a source of water and $Na^+$ ions, in which the water is decomposed according to the following reaction: $Na^+ + H_2O + e^- \rightarrow NaOH + \frac{1}{2}H_2$, wherein $H_2$ is collected and removed from the cathode chamber and wherein NaOH is collected and removed from the cathode chamber; and
    means for facilitating the reaction of $CO_2$ and $H_2$ to form synthesis gas comprising CO and $H_2$.

2. The electrochemical cell according to claim 1, wherein the source of $Na_2CO_3$ comprises $Na_2CO_3$ obtained be reacting the NaOH removed from the cathode with a source of $CO_2$.

3. The electrochemical cell according to claim 2, wherein the source of $CO_2$ is atmospheric air.

4. The electrochemical cell according to claim 2, wherein the source of $CO_2$ is combustion gases.

5. The electrochemical cell according to claim 2, wherein the source of $CO_2$ is aerobic decomposition gases.

6. The electrochemical cell according to claim 1, wherein the means for facilitating the reaction of $CO_2$ and $H_2$ to form synthesis gas comprises a catalyst exposed to the mixture of $CO_2$ and $H_2$.

7. The electrochemical cell according to claim 6, wherein the catalyst comprises a watergas shift catalyst.

8. The electrochemical cell according to claim 6, wherein the catalyst comprises a Fischer-Tropsch catalyst.

9. The electrochemical cell according to claim 6, wherein the mixture of $CO_2$ and $H_2$ is heated to enable a homogenous gas phase equilibrium reaction.

10. The electrochemical cell according to claim 6, wherein the means for facilitating the reaction of $CO_2$ and $H_2$ to form synthesis gas further comprises an oxygen ion conducting electrolysis cell to cause electrolysis of $CO_2$ to form CO, which is mixed with $H_2$ to produce synthesis gas.

11. The electrochemical cell according to claim 1, wherein the electrochemical cell is embodied within a plurality of stacked electrochemical cells separated by bipolar plates.

12. The electrochemical cell according to claim 1, wherein the membrane which permits transport of $Na^+$ ions comprises a sodium super ionic conductor ceramic material.

13. The electrochemical cell according to claim 1, wherein the separator which permits transport of $H^+$ ions is one of a microporous separator, a cation exchange membrane, a mesh and a screen.

* * * * *